United States Patent
Bertram

(10) Patent No.: US 7,168,039 B2
(45) Date of Patent: Jan. 23, 2007

(54) METHOD AND SYSTEM FOR REDUCING THE HORIZONTAL SPACE REQUIRED FOR DISPLAYING A COLUMN CONTAINING TEXT DATA

(75) Inventor: Randal Lee Bertram, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 927 days.

(21) Appl. No.: 09/089,098

(22) Filed: Jun. 2, 1998

(65) Prior Publication Data

US 2001/0021936 A1    Sep. 13, 2001

(51) Int. Cl.
*G06F 15/00* (2006.01)

(52) U.S. Cl. .................... 715/534; 715/526
(58) Field of Classification Search ............ 707/526, 707/508, 509, 517, 519, 534, 540, 503; 715/526, 715/539, 534
See application file for complete search history.

(56) References Cited

U.S. PATENT DOCUMENTS

| | | | | |
|---|---|---|---|---|
| 4,457,638 A | | 7/1984 | Horn et al. ............... 400/279 |
| 4,459,049 A | * | 7/1984 | Howell et al. ............. 400/17 |
| 4,484,826 A | | 11/1984 | Horn et al. ............... 400/279 |
| 4,486,857 A | * | 12/1984 | Heckel ................. 345/472.1 |
| 4,575,813 A | | 3/1986 | Bartlett et al. ............. 707/521 |
| 4,608,664 A | | 8/1986 | Bartlett et al. ............. 358/1.2 |
| 4,760,528 A | * | 7/1988 | Levin ....................... 400/98 |
| 5,264,926 A | | 11/1993 | Rylander ................... 358/500 |
| 5,458,376 A | * | 10/1995 | Biewald ..................... 283/115 |
| 5,557,787 A | * | 9/1996 | Shin et al. .................. 707/4 |
| 5,566,330 A | | 10/1996 | Sheffield ................... 707/4 |
| 5,583,660 A | | 12/1996 | Rylander ................... 358/456 |
| 5,668,961 A | * | 9/1997 | Healy et al. ............... 345/339 |
| 5,691,708 A | * | 11/1997 | Batchelder et al. ....... 340/825.44 |
| 5,937,417 A | * | 8/1999 | Nielsen ..................... 345/711 |
| 5,956,433 A | * | 9/1999 | Sasaki ....................... 382/275 |
| 6,073,129 A | * | 6/2000 | Levine et al. ............... 707/4 |
| 6,345,283 B1 | * | 2/2002 | Anderson .................. 707/205 |

(Continued)

FOREIGN PATENT DOCUMENTS

EP    0863499 A2 *  9/1998

(Continued)

OTHER PUBLICATIONS

The American Heritage Dictionary, Second College Edition, Houghton Mifflin Company, p. 1300.*

(Continued)

*Primary Examiner*—Cong Lac Huynh
(74) *Attorney, Agent, or Firm*—Joscelyn G. Cockburn

(57) ABSTRACT

A method and system for reducing an amount of horizontal space required when displaying a plurality of columns on a display screen is disclosed. The at least one column of the plurality of columns has at least one entry containing text data. The method and system include obtaining the at least one entry from the at least one column, and abbreviating a width of the at least one entry, determining if there is another entry containing text data. The method and system further include repeating the steps of obtaining the at least one entry, abbreviating the at least one entry and determining if there is another entry until all of the at least one entries are abbreviated. The method and system further include displaying the at least one column having the at least one abbreviated entry.

42 Claims, 6 Drawing Sheets

U.S. PATENT DOCUMENTS 6,356,920 B1 * 3/2002 Vandersluis ............. 715/501.1
6,854,642 B1 * 2/2005 Metcalf et al. ............. 235/375
2001/0013032 A1 * 8/2001 Kobayashi et al. ............ 707/1
2005/0193337 A1 * 9/2005 Noguchi et al. ............ 715/542

OTHER PUBLICATIONS

IBM Technical Disclosure Bulletin, Abbreviated Typing for Word Processing, Feb. 1979, p. 3796-3797.*

Mostert et al., Omni-font character recognition using templates and neural networks, IEEE, Sep. 1992, pp. 249-257.*

* cited by examiner

FIG. 2 (PRIOR ART)

| SYSTEM | BYTES RECEIVED | BYTES SENT | CPU UTILIZATION | DISK 1 WORKLOAD |
|---|---|---|---|---|
| 10 | 3 | 3 | 5 | 5 |
| 22 | 5 | 5 | 3 | 3 |
| 24 | 7 | 4 | 7 | 5 |
| 26 | 8 | 3 | 8 | 6 |
| 28 | 5 | 6 | 9 | 5 |

Columns: 31, 32, 34, 36, 38 — Table 30

FIG. 4 (PRIOR ART)

| SYSTEM | BYTES | BYTES | CPU U | DISK | DISK |
|---|---|---|---|---|---|
| 10 | 3 | 3 | 5 | 5 | 5 |
| 22 | 5 | 5 | 3 | 3 | 5 |
| 24 | 7 | 4 | 7 | 5 | 6 |
| 26 | 8 | 3 | 8 | 6 | 5 |
| 28 | 5 | 6 | 9 | 5 | 4 |

Columns: 71, 72, 74, 76, 78, 80 — Table 70

FIG. 8

| SYSTEM | BytsR | BytsS | CPU Ut | Dsk1W | Dsk2W |
|---|---|---|---|---|---|
| 10 | 3 | 3 | 5 | 5 | 5 |
| 22 | 5 | 5 | 3 | 3 | 5 |
| 24 | 7 | 4 | 7 | 5 | 6 |
| 26 | 8 | 3 | 8 | 6 | 5 |
| 28 | 5 | 6 | 9 | 5 | 4 |

Columns: 210, 220, 230, 240, 250, 260 — Table 200

METHOD AND SYSTEM FOR REDUCING THE HORIZONTAL SPACE REQUIRED FOR DISPLAYING A COLUMN CONTAINING TEXT DATA

FIELD OF THE INVENTION

The present invention relates to graphically displaying data and more particularly to a method and system for reducing the horizontal space used to display a column containing text data.

BACKGROUND OF THE INVENTION

To allow a user to easily understand data relating to a variety of objects, data is often displayed in a table organized into rows and columns. Columns in the table may have entries containing text data. Columns with entries containing text data may take up more horizontal space than is desirable. For example, each column typically includes a column heading describing the data in the column. Thus, the column heading typically contains text data. In many cases, the column heading is significantly longer than the data in the other column entries. This can cause several problems such as wasting space on the display or forcing a user to scroll horizontally to view data for some of the columns.

One context in which column entries containing text data require a great deal of horizontal space is in capacity management. Capacity management is of increasing interest for a network containing a plurality of systems. Capacity management refers to the monitoring of and upkeep of the network. The network may contain servers, computer systems for individual users of the network, mainframes, printers, or other systems. Depending on the size of the network, the network could be made up of only a few systems or thousands of systems. A network administrator is typically responsible for ensuring that individual portions of the network function and that the network as a whole functions.

In order to ensure that the network functions, the network administrator keeps track of monitors for each system. A monitor is an attribute of a particular system. For example, monitors include central processing unit ("CPU") utilization, disk space available, disk work load, the number of bytes sent by the system, and the number of bytes received by the system.

Applications allow a user such as a system administrator to query the systems within the network and receive information relating to each system's monitors. Once the data relating to the monitors are received, a network administrator typically displays the data on a display for the network administrator's system. One way of displaying this data is in the form of a table. Typically, a column of the table includes entries for a monitor and a row of the table has data relating to monitors for one system within the network. Typically, each column has a column heading indicating the monitor displayed for that monitor. Thus, each column has an entry, the heading, containing text data. Similarly, each row may have a row heading indicating the system within the network from which the monitors are received.

The heading for each column describing the monitor is typically significantly longer than the data in another entry for the monitor. Because of the large number of monitors that may have been queried and the width of the column heading, a conventional table may extend beyond the display of the network administrator's system. In order to view entries for some of the monitors, the network administrator scrolls horizontally to bring data relating to additional monitors into view. Many users do not wish to perform horizontal scrolling or do not realize that horizontal scrolling is available. In addition, because of the difference in length between some column headings and the other entries in these columns, there is a great deal of wasted space on the display. Thus, it is difficult for a network administrator to work with the information displayed in the table.

In order to allow the user to avoid horizontal scrolling and to more efficiently display information, some conventional applications truncate the column width or allow a user to edit column headings or other entries containing text data. For example, in a table displaying monitors, the column heading "CPU Utilization" might be truncated to be "CPU Ut". However, information important in identifying the monitor may be lost by truncating the column heading.

Another conventional method for shortening column headings is to allow the user to edit individual column headings or other entries containing text data. However, editing the column headings may be time consuming. For example, if there is a large number of monitors which the network administrator wants to view, the network administrator may need to edit the heading for each column. If there is a large number of other entries containing text data, the task of editing the column entries becomes even more time consuming. In addition, each time the network administrator generates a new table to receive an update on the monitors, the network administrator must edit these column headings. This consumes the network administrator's time.

If the number of column headings is very limited, a conventional application might store a shortened heading for each column to allow the table to occupy less horizontal space. However, storing shortened headings for each column may be problematic: where there are a large number of columns or where new columns may be provided. For example, a network administrator may wish to view data regarding a large number of monitors. In addition, the language in which the monitors are to be displayed may change. Moreover, the network administrator may want to view data for a new monitor not previously supplied. The network administrator may then write an application to provide information for a new monitor. Different applications could also be used to query the monitors for the systems in the network. These applications could place the monitors in a different order or provide data for different monitors. If the column contains other entries having text data, it become even more difficult to store shortened headings in advance. Consequently, it may be difficult to determine in advance the shortened headings which should be stored and to which column the shortened heading corresponds.

Accordingly, what is needed is a system and method for reducing the horizontal space required by a column heading. The present invention addresses such a need.

SUMMARY OF THE INVENTION

The present invention provides a method and system for reducing an amount of horizontal space required when displaying a plurality of columns on a display screen. At least one column of the plurality of columns has at least one entry containing text data. The method and system comprise obtaining the at least one entry from the at least one column, abbreviating a width of the at least one entry, and determining if there is another entry containing text data. The method and system further comprise repeating the steps of obtaining the at least one entry, abbreviating the at least one entry and determining if there is another entry until all of the at least one entries are abbreviated. The method and system further comprise displaying the at least one column having the at least one abbreviated entry.

According to the system and method disclosed herein, the present invention can display information in a format more easily viewed by a user.

BRIEF DESCRIPTION OF THE DRAWINGS

FIG. 2 is a block diagram depicting a table containing information relating to a variety of monitors.

FIG. 4 is a block diagram of a table after column headings have been truncated.

FIG. 8 is a block diagram of a table after column headings have been abbreviated using a method in accordance with the present invention.

DETAILED DESCRIPTION OF THE INVENTION

The present invention relates to an improvement in displaying data in tables which use horizontal space more efficiently. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1A:
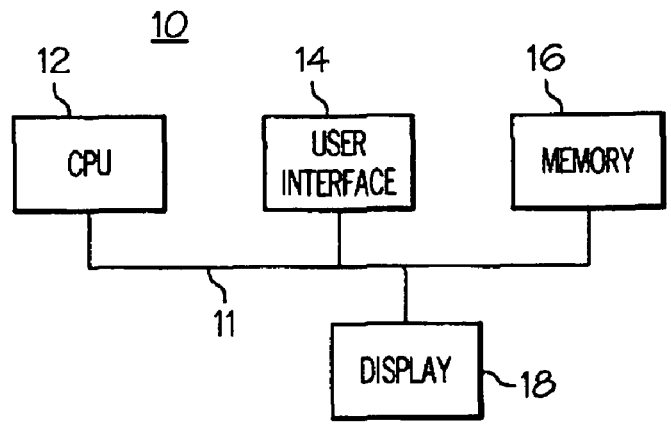
FIG. 1A is a block diagram of a computer system.

FIG. 1A is a block diagram of a computer system 10 in which the present invention can be used. The computer system 10 includes a central processing unit ("CPU") 12 coupled to a system bus 11. Also coupled to the system bus 11 are a user interface 14, a memory 16, and a display 18. Through the user interface 14, the user can input information to the computer system 10. The display 18 allows the user to view information, for example in table form.

Figure 1B:
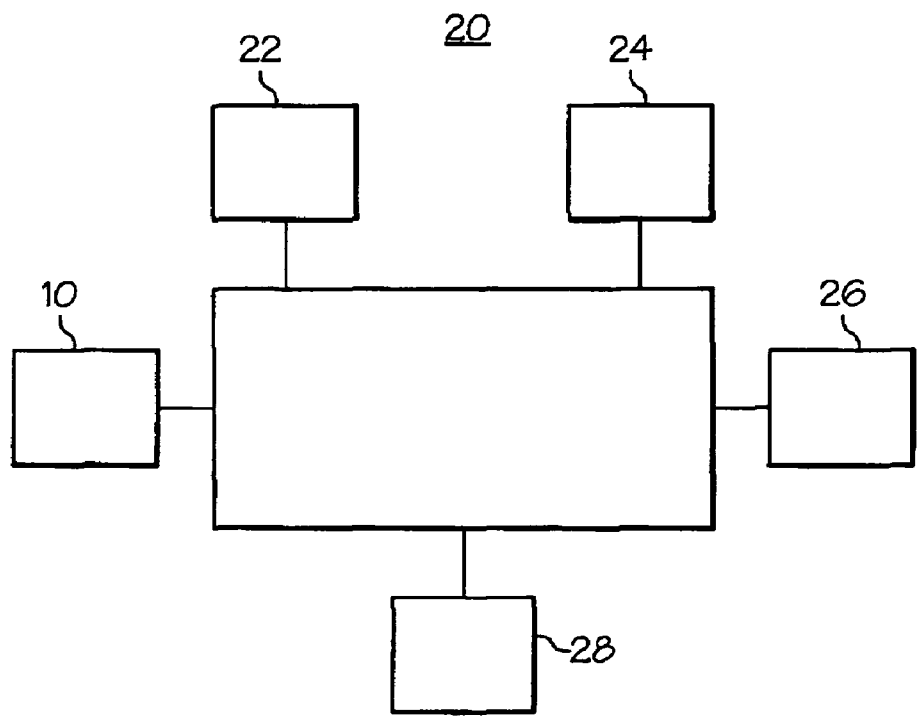
FIG. 1B is a block diagram of a network in which the computer system may reside.

FIG. 1B depicts a network 20 in which the computer system 10 might reside. The network 20 also includes systems 10, 22, 24, 26, and 28. The systems 22, 24, 26, and 28 could include other computer systems, servers, printers, or other apparatus. Although depicted as including five systems 10, 22, 24, 26, and 28, the network 20 could include any number of systems, from one system to thousands of systems, or more.

Referring to FIGS. 1A and 1B, a user of the system 10 may wish to view data on the display 18. To allow a user to easily understand data relating to a variety of objects, data is often shown on the display 18 in a table. The data displayed in the table could relate to a variety of subjects. Data in the table is typically arranged in rows and columns. Each column has entries which could include text data. Text data in entries of a column could require a great deal of horizontal space.

For example, tables with columns having entries containing text data are used in capacity management. Capacity management is of increasing interest for a network containing a plurality of systems, such as the network 20. Capacity management allows a network administrator using the system 10 to monitor the network 20 and ensure that the network 20 functions properly. In order to ensure that the network 20 functions, the network administrator keeps track of monitors for each system 10, 22, 24, 26, and 28. A monitor is an attribute of a particular system 10, 22, 24, 26, or 28. For example, monitors include CPU utilization, disk space available, the number of bytes sent by the system, and the number of bytes received by the system.

Applications, not shown, allow a user to query each system 10, 22, 24, 26, or 28 and receive information relating to each system's monitors. Once the data relating to the monitors are received, a network administrator typically desires to view the data on the display 18. One way of displaying this data is in the form of a table.

FIG. 2 depicts a table 30 displaying monitors for the systems 22, 24, 26, and 28. The table 30 includes columns 31, 32, 34, 36, and 38. The first column 31 indicates the system 22, 24, 26, or 28 for which the remaining columns 32, 34, 36, and 38 contain monitors. The columns 32, 34, 36, and 38 include entries for a monitor for each system. A row of the table 30 has data relating to monitors for one system 10, 22, 24, 26, and 28 within the network 20. Each column 31, 32, 34, 36, and 38 has a column heading indicating the monitor displayed for that monitor. Thus, each column has an entry, the column heading, containing text data. The column 31 has a heading "System." The heading for the column 32 is "Bytes Received." The column 34 has a heading "Bytes Sent." The heading for the column 36 is "CPU Utilization." The heading for the column 38 is "Disk I Work Load." Other columns, not shown, may have other column headings.

As depicted in FIG. 2, the text data in the headings for columns 31, 32, 34, 36, and 38 occupies a significant amount of horizontal space. In the table 30 shown, the column heading describing columns 31, 32, 34, 36, and 38 is often significantly longer than the data in an entry for the column 31, 32, 34, 36, and 38. Because of the large number of monitors that may have been queried and the length of the heading for each column 31, 32, 34, 36, and 38, the table 30 may extend beyond the display 18. In order to view columns, not shown, for some of the monitors, the network administrator scrolls horizontally to bring data relating to additional monitors into view. Many users do not wish to perform horizontal scrolling or do not realize that horizontal scrolling is available. In addition, because of the difference in length between some column headings and the entries in these columns 31, 32, 34, 36, and 38, there is a great deal of wasted space on the display 18.

Figure 3:
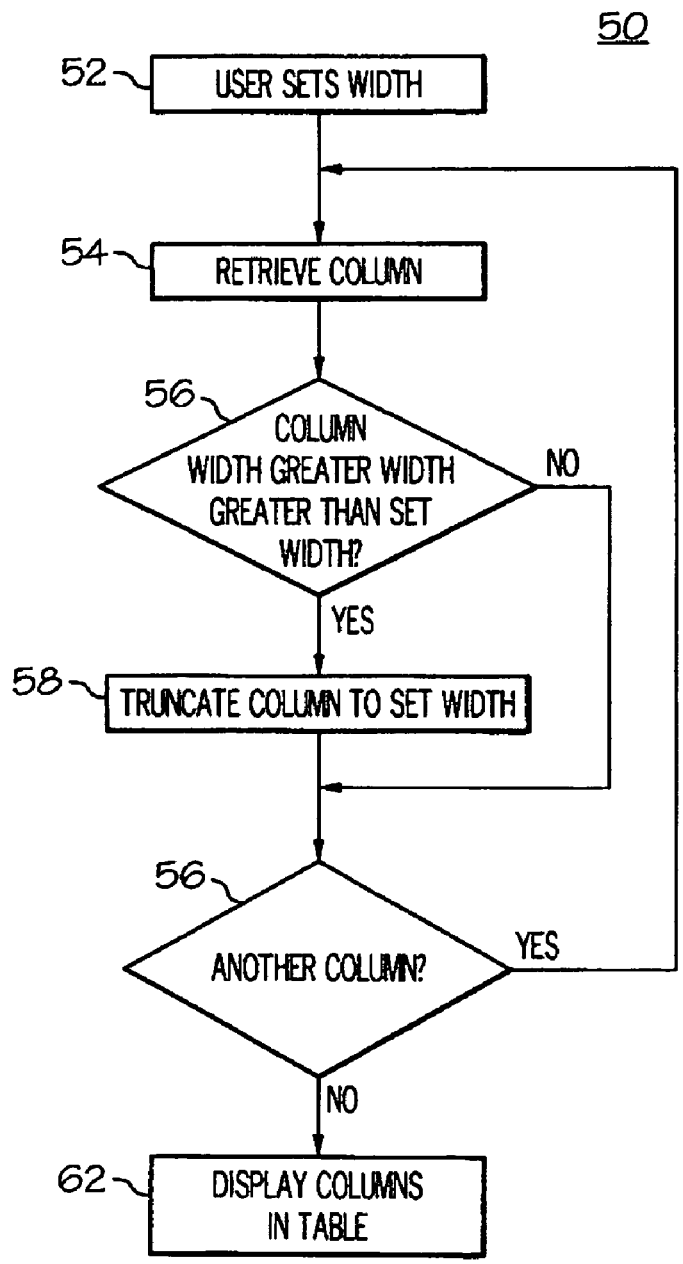
FIG. 3 is a flow chart depicting one conventional method for truncating a column heading.

In order to reduce the horizontal space occupied by text data in an entry, such as a column heading, some conventional methods truncate the width of the column. For example, to allow the user to avoid horizontal scrolling and more efficiently display information, some conventional applications truncate headings for a column 31, 32, 34, 36, and 38. FIG. 3 depicts a conventional method 50 for truncating column headings.

The user enters the desired width of the column heading via step 52. A column is then retrieved via step 54. It is then determined via step 56 if the column is wider than the width set by the user. If the column is wider, then the column is truncated via step 58. If the column is not wider, then the step 58 is omitted. It is then determined if there are any columns remaining. If there are columns remaining, then step 54 through 60 are repeated for the next column. If no columns remain, then the table is displayed via step 62. The method then terminates via step 64.

FIG. 4 depicts a table 70 displayed after the conventional method 50 has been used to truncate the columns to be five characters in width. The table 70 contains the same information as the table 30. Thus, the column 71 has a column heading for the "Syste" for the system. The column 72 has a heading "Bytes" for the bytes received. The column 74 has a information relating to the bytes sent and has a heading "Bytes." The heading for the column 76 is "CPU U" and contains data relating to CPU utilization. The column heading for the column 78 is "Disk" and contains information relating to the "Disk 1 " work load. The heading for the column 80 is "Disk " for the "Disk 2 " work load. Other columns, not shown, may have other column headings. Because each column 71, 72, 74, 76, 78, and 80 has been truncated, column 80 can be displayed to the system administrator without horizontal scrolling.

Although the table 70 has more narrower columns 71, 72, 74, 76, 78, and 80, one of ordinary skill in the art will readily realize that important information in the headings for the columns 71, 72, 74, 76, 78, and 80 has been lost. Referring to FIGS. 2 and 4, the second column in both tables 30 and 70 refers to bytes received. The third column in both tables 30 and 70 refers to bytes sent. However, as shown in FIG. 4, because the headings for columns 72 and 74 have been truncated, it cannot be determined from the headings for columns 72 and 74 which column 72 or 74 contains bytes received and which column 72 or 74 contains bytes sent. Similarly, although columns 78 and 80 both have heading stating "Disk ," the column 78 and 80 refer to different disks. Thus, it cannot be determined from the headings for columns 78 and 80 which column contains information relating to "Disk 1," and which contains information relating to "Disk 2." Consequently, truncating the headings for the columns 71, 72, 74, 76, 78, and 80 in the table 70 does not adequately display information to the user or system administrator.

Referring back to FIGS. 1A, 1B, and 2, another conventional method for shortening headings for columns is to allow the user to edit individual column headings for the columns 31, 32, 34, 36, and 38. However, one of ordinary skill in the art will readily realize that editing the column headings may be time consuming. For example, if there are a large number of monitors which the network administrator wants to view, the network administrator may need to edit the column heading for each column 31, 32, 34, 36, and 38. In addition, each time the network administrator generates a new table 30 to receive an update on the monitors for the systems 10, 22, 24, 26, and 28 in the network 20, the network administrator must edit these column headings. This consumes the network administrator's time. Moreover, for a table, not shown, having columns with multiple entries containing text data, a user may need to edit each entry containing text data. Where there are a large number of entries, editing each entry is even more time consuming. Thus, allowing a user to edit the column headings does not adequately address how information is displayed in the table 30.

If the number of column headings is very limited, a conventional application might store a shortened heading for each column 31, 32, 34, 36, and 38 to allow the table 30 to occupy less horizontal space. However, one of ordinary skill in the art will readily realize that storing a shortened heading for each column 31, 32, 34, 36, and 38 may be problematic where there are a large number of columns 31, 32, 34, 36, and 38 or where new columns 31, 32, 34, 36, and 38 may be provided. Providing shortened text data is also problematic where each column 31, 32, 34, 36, and 38 has many entries with text data.

For example, a network administrator may wish to view data regarding a large number of monitors in the table 30. In addition, the language in which the monitors are to be displayed may change. Moreover, the network administrator may want to view data for a new monitor not previously supplied. The network administrator may then write an application to provide information for a new monitor. Different applications, not shown, could also be used to query the monitors for the systems 10, 22, 24, 26, and 28 in the network 20. These applications could place the monitors in a different order, query different monitors, or even provide the information in a different language. Consequently, it may be difficult to determine in advance the shortened headings which should be stored and to which column 31, 32, 34, 36, or 38 the shortened heading corresponds.

The present invention provides a method and system for reducing an amount of horizontal space required when displaying a plurality of columns on a display screen. The at least one column of the plurality of columns has at least one entry containing text data. The method and system include obtaining the at least one entry from the at least one column, and abbreviating a width of the at least one entry, determining if there is another entry containing text data. The method and system further include repeating the steps of obtaining the at least one entry, abbreviating the at least one entry and determining if there is another entry until all of the at least one entries are abbreviated. The method and system further include displaying the at least one column having the at least one abbreviated entry.

The present invention will be described in terms of abbreviating column headings. However, the present invention can be used to abbreviate another entry having text data. The present invention will be described in terms of a table used to display monitors relating to systems in a network. However, one of ordinary skill in the art will readily recognize that this method and system will operate effectively for other tables storing other types of information. The method and system will also be described in terms of particular sources for data to be displayed in a table, using the English language to display data, and performing the method for a plurality of columns in a table. However, one of ordinary skill in the art will readily realize that the method and system could be used with other sources for data, with tables displaying information in other languages, and for a single column or a number of columns less than the total number of columns in a particular table.

Figure 5:
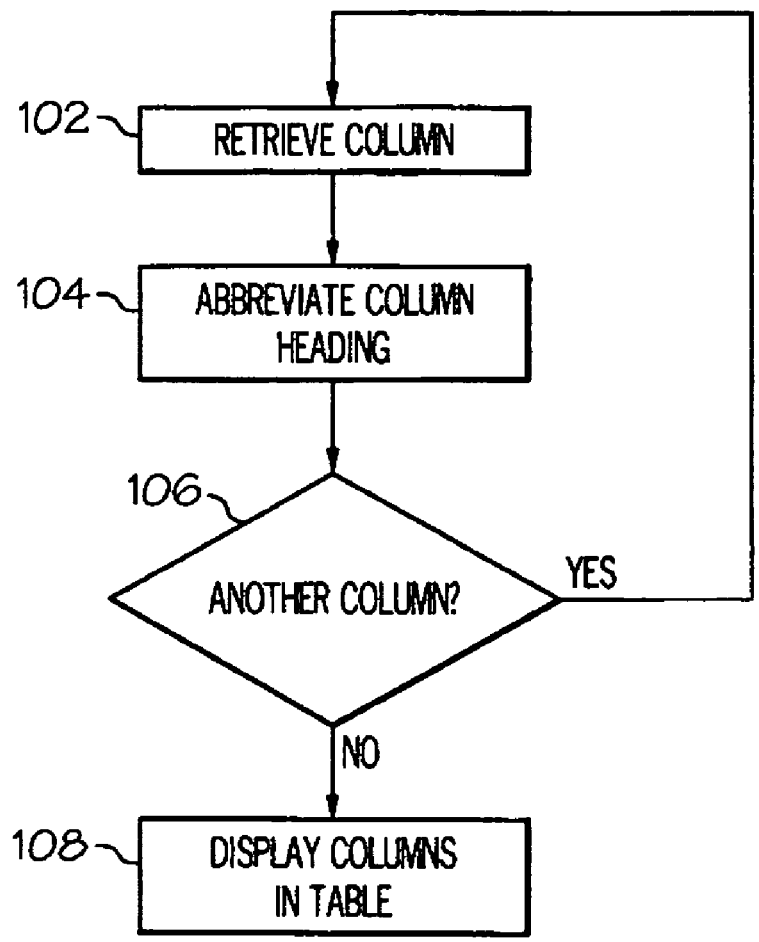
FIG. 5 is a high level flow chart depicting one method in accordance with the present invention for reducing the horizontal space required by a column heading.

To more particularly illustrate the method and system in accordance with the present invention, refer now to FIG. 5 depicting a flow chart of one embodiment of a method 100 for reducing the horizontal space used to display data in a table. The method 100 could be used with the system 10 and the network 20. Thus, the method 100 is useful when displaying monitors for each system 10, 22, 24, 26, and 28 in the network 20.

A column is first retrieved via step 102. Preferably, retrieving a column refers to obtaining the column heading and, perhaps, other information used in the method 100. The column heading is abbreviated via step 104. In an embodiment abbreviating another entry having text data, the other entry having text data is abbreviated in step 100. It is then determined if another column which has not had its column heading abbreviated is available via step 106. In an embodiment in which another entry having text data is abbreviated, it is determined if another column which has an entry containing text data that has not been abbreviated is available in step 106. If so, then step 102 is returned to for the next column. If no unabbreviated columns remain, then the table is displayed via step 108. Note that although the method 100 depicts the step of displaying the columns as occurring after abbreviations are completed for all columns, nothing prevents a column from being displayed earlier.

Abbreviating the column heading rather than truncating the column heading allows certain information to be preserved. In addition, the actual algorithm for abbreviating the column heading can vary. For example, the abbreviation step 104 could include eliminating lower case vowels, eliminating spaces, eliminating certain other characters, or any combination thereof. Moreover, because the user need not enter the abbreviations by hand, reducing the horizontal space required using the method 100 is not time consuming. In addition, the method 100 can adapt to new monitors or columns, new sources of data, new languages, and other changes.

Figure 6:
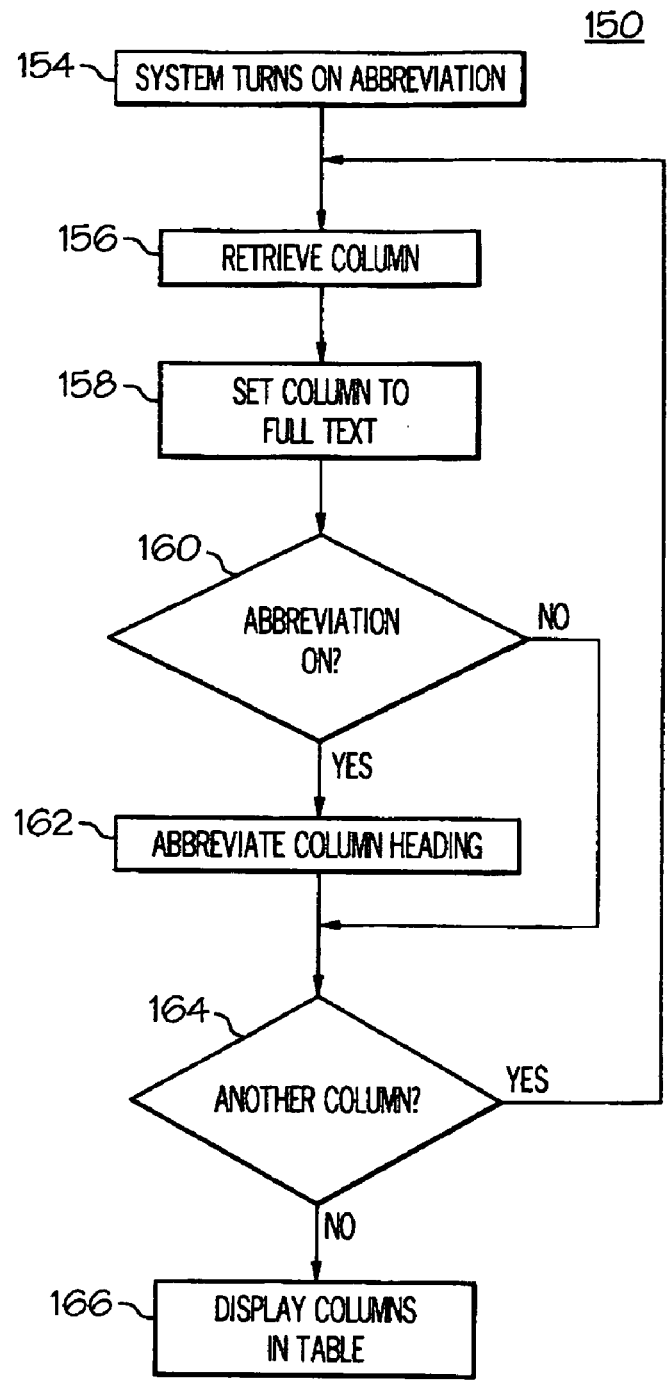
FIG. 6 is a more detailed flow chart depicting one method in accordance with the present invention for reducing the horizontal space required by a column heading.

FIG. 6 depicts a more detailed flow chart of a method 150 for abbreviating column headings in accordance with the present invention. The method 150 has the advantages of the method 100. In one embodiment, the method 150 can be used for abbreviating another entry containing text data in a column. In such an embodiment, steps discussed as being performed on a column heading are performed on the entry containing text data.

The system 10 turns on the abbreviation via step 154. In one embodiment, the system 10 turns on the abbreviation in response to the user turning on or off the abbreviation or setting the column heading width. A column is then retrieved via step 156. Thus, the first column is initially retrieved. Step 156 is analogous to step 102 in the method 100. The column heading may then be set to its full text description, via step 158. It is then determined whether the abbreviation is on via step 160. If the user has turned abbreviation on, then the column heading is abbreviated via step 162. Thus, step 162 is analogous to the step 104 of the method 100. If abbreviation has not been activated, then the step 162 is skipped. It is then determined if another, unabbreviated column is available, via step 164. if there is another column available, then the method 150 returns to step 156 in order to retrieve the next column. Thus, steps 156 through step 164 are repeated. If there are no other columns available, then the columns are displayed via step 166. Note that although the method 150 depicts the step of displaying the columns as occurring after abbreviations are completed for all columns, nothing prevents a column from being displayed earlier.

Figure 7:
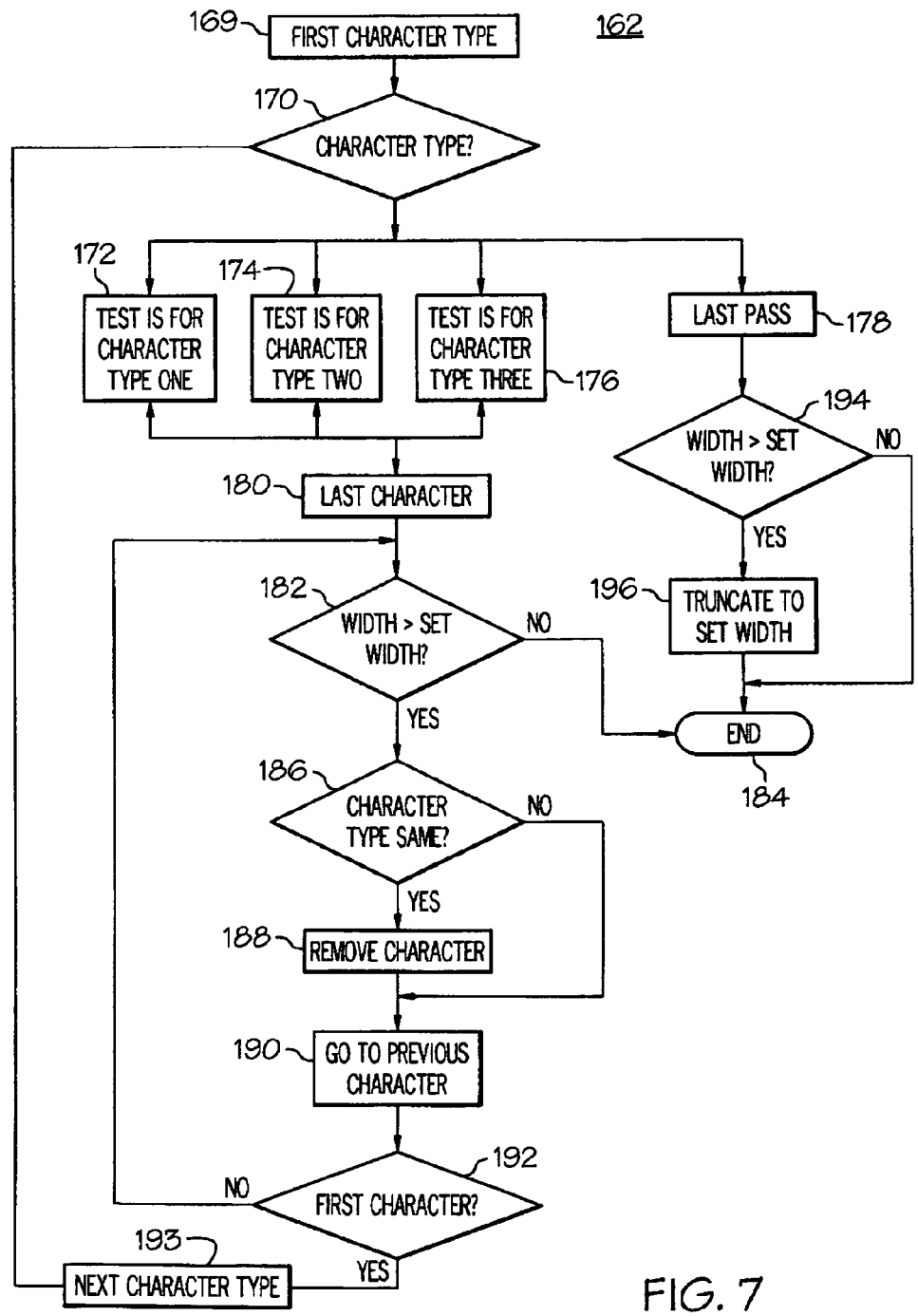
FIG. 7 is a detailed flow chart depicting one method in accordance with the present invention for abbreviating a column heading.

FIG. 7 depicts another more detailed flow chart of one method for performing the abbreviation step 162 of the method 150 or the step 104 of the method 100. The first character type is retrieved via step 169. It is then determined which character type will undergo abbreviation for a particular pass through a column heading via step 170. Thus, step 170 determines a current character type. In a preferred embodiment, there are three character types: lower case vowels (type two), lower case letters (type three), and spaces (type one). In another embodiment, other character types can be chosen. For example, letters other than vowels could be chosen as type two, the second character type. In addition, the character types could be in another order. For example, in an alternate embodiment, the type one character could be designated as lower case letters, etc.

Via steps 172, 174, 176, and 178 the test for the character type is set. If the character type was determined to be type one in step 170, then the system 100 will informed that the column heading should be tested for spaces in step 172. If the character type was determined to be type two in step 170, then the system 100 will informed that the column heading should be tested for lower case vowels in step 174. If the character type was determined to be type three in step 170, then the system 100 will informed that the column heading should be tested for lower case characters in step 176. If the character type is not type one, type two or type three, then step 178 is used. Thus, in a first pass through the column heading, the character type will be type one. In a second pass through the column heading, the character type will be type two. In a third pass through the column heading, the character type will be type three. In the fourth pass, step 178 will be used. Even though the preferred embodiment uses four passes other number of passes could be used without deviating from the teachings of the present invention.

The last character for the column heading is retrieved via step 18C. It is then determined if the width of the column heading is greater than the width set in step 52 of the method 50, via step 182. If the width is not greater than the width set, the abbreviation is terminated via step 184. Thus, the abbreviation method 162 can be terminated when the column heading reaches the set width regardless of the number of passes made for the heading.

If the width is greater than the set width, then via step 186 it is determined if the character is the same type as set in steps 172, 174, or 176. Thus, in a preferred embodiment, for a first pass through the column heading, it is determined if the character is a space via step 186. For a second pass through the heading determined using step 174, then in a preferred embodiment it is determined if the character is a lower case vowel via step 186. If it is the third pass through the heading, then in a preferred embodiment, it is determined if the character is a lower case character step 186. As a result, step 186 determines if the character matches the character type for the appropriate pass via set step 186.

If the character matches the current character type in step 186, then the character is removed in step 188. If, however, the test in step 186 determines that the character does not match the current character type, then step 188 is skipped. The previous character is then retrieved via step 190. Via step 192 it is determined if the character retrieved in step 190 is the first character. If the character is not the first character, then step 182 through step 192 are repeated. Thus, each character in the column heading is tested to see if it matches the current character type and removed if a match is found. If in step 192 it is determined that the first character was retrieved, then in step 193 the next character type is retrieved. Step 170 is then returned to in order to determine the next character type for the next pass through the column heading. If the first three character types in step 172, 174, and 176 have been exhausted, then step 178 is used.

Step 178 sets the test as being a truncation test. Thus, in the last pass through the column heading, the column heading may be truncated. It is determined via step 194 if the width of the column heading is still greater than set in step 152. If the width is greater, then the column heading is truncated to the appropriate number of characters via step 196. If the width is not greater, then step 196 is omitted. The abbreviation method 162 is then terminated via step 184.

FIG. 8 depicts a table 200 after abbreviation has been completed via the methods 100 or 150. The table 200 contains columns 210, 220, 230, 240, 250, and 260. The table 200 contains the same information as in the tables 30 and 70 of FIGS. 2 and 4, respectively. Referring back to FIG. 8, the column headings have been abbreviated as discussed with respect to the step 162. Thus, spaces, lower case vowels and lower case letters have been removed to limit the heading of each column 210, 220, 230, 240, 250, and 260 to five characters.

The horizontal space used by the table 200 has been reduced without losing vital information. For example, in contrast to the table 70 of FIG. 4, the columns 220 and 230 can be distinguished. In particular, it is clear that the column 220 refers to bytes received ("BytsR"), while the column 230 refers to bytes sent ("BytsS"). Similarly, it is clear that the column 250 refers to the first disk's work load ("Dsk 1W"), while the column 260 refers to the second disk's work load ("Dsk 2W"). Thus, a user can still distinguish between information contained in different columns of the table 200.

In addition, the user did not have to enter the abbreviations by hand. Instead, the user merely switched the abbreviation on via step 152. Thus, the user's time is not needlessly consumed. In addition, the method 100 or 150 can be adapted to different languages, different monitors, or different sources for data. The method abbreviates existing columns, rather than storing shortened headings for particular columns. As a result, the abbreviations method 100 and 150 need not know in advance which column contains what data or in what order the columns are arranged. In addition, the method 100 and 150 can be used for data other than capacity management. Moreover, by changing the abbreviations tests in 172, 174, 176, or 178, the user can adapt the method 100 or 150 to different languages.

A method and system has been disclosed for reducing the amount of horizontal space required when displaying text data in a table. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer generated method for reducing an amount of horizontal space required when displaying a plurality of column on a display screen, at least one column of the plurality of columns including at least one entry containing text data, the method comprising the steps of:
    (a) defining a first character type as a space, a second character type as a lower case vowel and a third character type as a lower case letter;
    (b) obtaining the at least one entry; and
    (c) abbreviating a width of the at least one entry by
        (c1) removing at least one of the first character type if the at least one entry includes the at least one of the first character type;
        (c2) removing at least one of the second character type if the at least one entry includes the at least one of the second character type; and
        (c3) removing at least one of the third character type if the at least one entry includes the at least one of the third character type.

2. A method for reducing an amount of horizontal space required when displaying a plurality of columns on a display screen, at least one column of the plurality of columns having at least one entry containing text data, the method comprising the steps of:
    (a) obtaining the at least one entry from the at least one column;
    (b) abbreviating a width of the at least one entry;
    (c) determining if there is another entry containing text data;
    (d) repeating steps (b) and (c) until all of the at least one entry of the at least one column are abbreviated; and
    (e) displaying the at least one column having the at least one abbreviated entry.

3. The method of claim 2 wherein the at least one entry includes at least one column heading.

4. The method of claim 3 wherein the at least one column heading includes a first plurality of characters; and wherein abbreviating step (b) further includes the step of:
    (b1) removing at least one character of a second plurality of characters if the at least one column heading includes the at least one character.

5. The method of claim 4 wherein the second plurality of characters further includes a plurality of lower case vowels.

6. The method of claim 3 wherein the at least one column heading includes a plurality of characters, the plurality of characters being capable of containing at least one lower case character not a lower case vowel; and wherein abbreviating step (b) further includes the step of:
    (b1) removing the at least one lower case character if the at least one column heading includes the at least one lower case character.

7. The method of claim 3 wherein the at least one column heading includes a plurality of characters, the plurality of characters being capable of containing at least one space; and wherein abbreviating step (b) further includes the step of:
    (b1) removing the at least one space if the at least one column heading includes the at least one space.

8. The method of claim 2 wherein the abbreviating step further includes the steps of sequentially removing predetermined individual characters until the at least one entry has a width equivalent to a predetermined number of characteristics.

9. A method for reducing an amount of horizontal space required when displaying a plurality of column on a display screen, at least one column of the plurality of columns including at least one entry containing text data, the method comprising the steps of:
    (a) determining a character type;
    (b) obtaining the at least one entry; and
    (c) abbreviating a width of the at least one entry by
        (c1) removing at least one character having a first character type if the at least one entry includes the at least one character and if the character type is the first character type;
        (c2) removing at least one lower case character if the at least one entry includes the at least one lower case character and if the character type is a second character type, the second character type being a lower case character; and
        (c3) removing at least one space if the at least one entry includes the at least one space and if the character type is a third character type, the third character type being a space.

10. The method of claim 9 wherein the at least one entry further includes at least one column heading.

11. The method of claim 10 further comprising the step of:
    (d) repeating steps (b) and (c) for each of the at least one column for a particular character type of the plurality of character types.

12. The method of claim 11 further comprising the step of:
(e) repeating steps (a), (b), and (c) for each of the at least one columns for each of the plurality of character types.

13. The method of claim 12 wherein the at least one character of the plurality of characters removing step (c1) further includes the step of:
(c1i) removing the at least one character having the first character type if the at least one column heading includes the at least one character and if the at least one column heading is wider than a particular column width.

14. The method of claim 13 wherein the at least one lower case character removing step (c2) further includes the step of:
(c2i) removing the at least one lower case character if the at least one column heading includes the at least one lower case character, if the character type is the second character type, and if the at least one column heading is wider than the particular column width.

15. The method of claim 13 wherein the at least one space removing step (c3) further includes the step of:
(c3i) removing at least one space if the at least one column heading includes the at least one space, if the character type is the third character type, and if the at least one column heading is wider than the particular column width.

16. The method of claim 15 wherein the abbreviating step (c) further comprises the step of:
(c4) truncating the at least one column heading if the width of the at least one column heading is greater than the particular column width and if the at least one column heading does not contain any character of the first character type, the second character type, or the third character type.

17. A computer-readable medium containing a program for reducing an amount of horizontal space required when displaying a plurality of columns on a display screen, the plurality of columns including at least one column having at least one entry containing text data, the program comprising instructions for:
obtaining the at least one entry of the at least one column;
abbreviating a width of the at least one entry;
determining if there is another entry containing text data;
repeating the instructions for abbreviating the at least one entry and determining if there is another entry containing text data until all of the at least one entry is abbreviated; and
displaying the at least one abbreviate entry of the at least one column.

18. The computer-readable medium of claim 17 wherein the at least one entry includes at least one column heading.

19. The computer-readable medium of claim 18 wherein the at least one column heading include a first plurality of characters; and wherein the instructions for abbreviating the at least one column heading further includes instructions for:
removing at least one character of a second plurality of characters if the at least one column heading includes the at least one character.

20. The computer-readable medium of claim 19 wherein the second plurality of characters further includes a plurality of lower case vowels.

21. The computer-readable medium of claim 18 wherein the at least one column heading includes a first plurality of characters, the plurality of characters being capable of containing at least one lower case character; and wherein the instructions for abbreviating the column heading further includes instructions for:
removing the at least one lower case character if the at least one column heading includes the at least one lower case character.

22. The computer-readable medium of claim 18 wherein the at least one column heading includes a first plurality of characters, the plurality of characters being capable of containing at least one space; and wherein the instructions for abbreviating the at least one column heading further includes instructions for:
removing the at least one space if the at least one column heading includes the at least one space.

23. A computer-readable medium containing a program for reducing an amount of horizontal space used when displaying a plurality of columns on a display screen, at least one column of the plurality of columns having at least one entry containing text data, the at least one entry including a first plurality of characters, the program comprising instructions for:
(a) determining a character type;
(b) obtaining the at least one entry of the at least one column; and
(c) abbreviating a width of the at least one entry by
(c1) removing at least one character of a second plurality of characters having a first character type if the at least one entry includes the at least one character and if the character type is the first character type;
(c2) removing at least one lower case character if the at least one entry includes the at least one lower case character and if the character type is a second character type, the second character type being a lower case character; and
(c3) removing at least one space if the at least one entry includes the at least one space and if the character type is a third character type, the third character type being a space.

24. The computer-readable medium of claim 23 wherein the at least one entry includes at least one column heading.

25. The computer-readable medium of claim 24 further comprising instructions for:
(d) repeating the instructions (b) and (c) for a particular character type of the plurality of character types.

26. The computer-readable medium of claim 25 further comprising instructions for:
(e) repeating the instructions (a), (b), and (c) for each of the plurality of columns for each of the plurality of character types.

27. The computer-readable medium of claim 26 wherein the instructions for removing the at least one character of the plurality of characters (c1) further includes instructions for:
(c1i) removing the at least one character of a second plurality of characters having the first character type if the at least one column heading includes the at least one character, if the character type is the first character type, and if the at least one column heading is wider than a particular column width.

28. The computer-readable medium of claim 27 wherein the instructions for removing the at least one lower case character (c2) further includes instructions for:
(c2i) removing at least one lower case character if the at least one column heading includes the at least one lower case character, if the character type is the second character type, and if the at least one column heading is wider than the particular column width.

29. The computer-readable medium of claim 28 wherein the instructions for removing the at least one space (c3) further includes instructions for:

(c3i) removing at least one space if the at least one column heading includes the at least one space, if the character type is the third character type, and if the at least one column heading is wider than the particular column width.

30. The computer-readable medium of claim 23 wherein the instructions for abbreviating the at least one column heading (c) further includes instructions for:
(c4) truncating the at least one column heading if the at least one column heading is wider than the particular column width and if the at least one column heading does not contain any character of the first character type, the second character type or the third character type.

31. A system for reducing an amount of horizontal space used when displaying a plurality of column on a display screen, at least one column of the plurality of columns having at least one entry containing text data the system comprising:
means for obtaining the at least one entry of the at least one column;
means coupled with the obtaining means for abbreviating a width of the at least one entry; and
means coupled with the abbreviating means for displaying the at least one entry.

32. The system of claim 31 wherein the at least one entry includes at least one column heading.

33. The system of claim 32 wherein the at least one column heading further includes a plurality of characters and wherein the abbreviating means further comprise:
means for determining a character type for at least one of the plurality of characters, the character type including a first character type, a second character type, and a third character type;
means coupled with the determining means for removing the at least one of the plurality of characters if the character type is the first character type and if the width of the at least one column heading is greater than a particular width;
means coupled with the determining means for removing the at least one character if the character type is a second character type and if the width of the at least one column heading is greater than the particular width, the second character type being a lower case character;
means coupled with the determining means for removing the at least one character if the character type is a third character type and if the width of the at least one column heading is greater than the particular width, the third character type being a space; and
means coupled with the determining means for truncating the column heading if the width of the at least one column heading is greater than the particular width and if the at least one column heading does not contain any character of the first character type, the second character type or the third character type.

34. A computer generated method to abbreviate a character string comprising the acts of:
(a) providing the character string to be abbreviated;
(b) defining N character types to be removed for said character string, wherein N is greater than 1;
(c) defining a character string size having a predetermined number of characters to be in an abbreviated character string;
(d) selecting a character type from the N character types;
(e) searching the character string for a character of the selected character type;
(f) removing the selected character of the selected character type if detected in said search of the character string;
(g) comparing a remaining portion of the character string remaining after the selected character is removed with the character string size set forth in step (c);
(h) terminating removal of additional character type from said remaining portion of the character string if said remaining portion of the character string is not greater than the character string size; and
(i) repeating acts (d) through (h) if the remaining portion of the character string is greater than the character size.

35. The method of claim 34 including the act of displaying on a monitor the abbreviated character string.

36. The method of claim 34 wherein N is 3.

37. The method of claim 34 wherein the N character types include type one character representing space, type two character representing lower case vowels and type three character representing lower case letters, excluding vowels.

38. The method of claim 37 wherein searching begins at a last character in said character string proceeding backwards through the string.

39. The method of claim 38 wherein character types are removed in the following order—type one character, type two character and type 3 character.

40. A method for reducing an amount of horizontal space required when displaying a plurality of column on a display screen, at least one column of the plurality of columns including at least one entry containing text data, the method comprising the steps of:
(a) determining N character types, N greater than 1;
(b) obtaining the at least one entry; and
(c) abbreviating a width of the at least one entry by
(c1) removing at least on space if the at least one entry includes the at least one space and if the at least one space is a first character type of the N character types;
(c2) removing at least one lower case vowel if the at least one entry includes the at least one lower case vowel that is a second character type of the N character types; and
(c3) removing at least one lower case letter if the at least one entry includes the at least one lower case letter which is a third character type of the N character types, wherein removal of characters from the at least one entry begins at a last character of said at least one entry proceeding backwards through characters to a first character of said at least one entry and a portion of the at least one entry remaining after a character type is removed is correlated with a predetermined character size and if the portion of the at least one entry is not greater than the predetermined character size further removal of character type ends.

41. A computer method to abbreviate a character string comprising the acts of:
(a) defining N character types, N greater than 1;
(b) providing the character string;
(c) abbreviating the character string by
($c_1$) removing at least a first character if the character string includes the at least first character that is defined as a character type of the N character types.
($c_2$) removing at least a second character if the character string includes the at least second character that is defined as a character type of the N character types; and ($c_3$) removing at least a third character if the character string includes the at least character that is defined as a character type of the N character types.

42. The computer method of claim 41 further including the acts of defining a character string having a predetermined number of characters to be in the abbreviated character string; at the completion of each of the act $C_1$, $C_2$ and $C_3$ comparing a remaining portion of the character string with the character string size and terminating character removal if the remaining portion of the character string equals the character string size.

* * * * *